Figure 1:
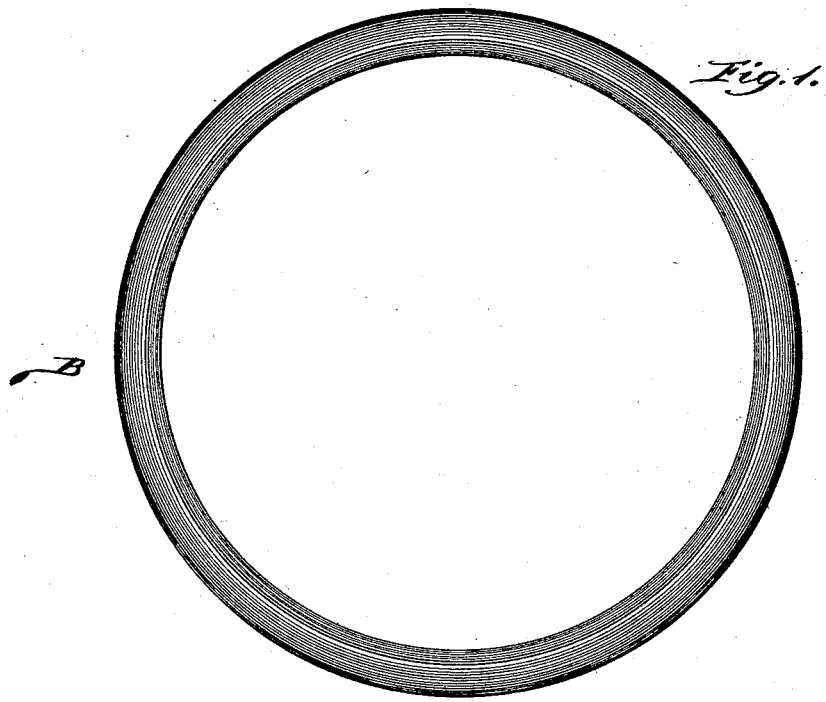

(No Model.)  3 Sheets—Sheet 1.

F. W. MORGAN & R. WRIGHT.
PNEUMATIC TIRE.

No. 496,789.  Patented May 2, 1893.

Witnesses
W. R. Middleton
Rita M. Wagner

Inventors
Fred W. Morgan
Rufus Wright
By Chas. G. Page
Atty.

(No Model.) 3 Sheets—Sheet 2.
F. W. MORGAN & R. WRIGHT.
PNEUMATIC TIRE.
No. 496,789. Patented May 2, 1893.
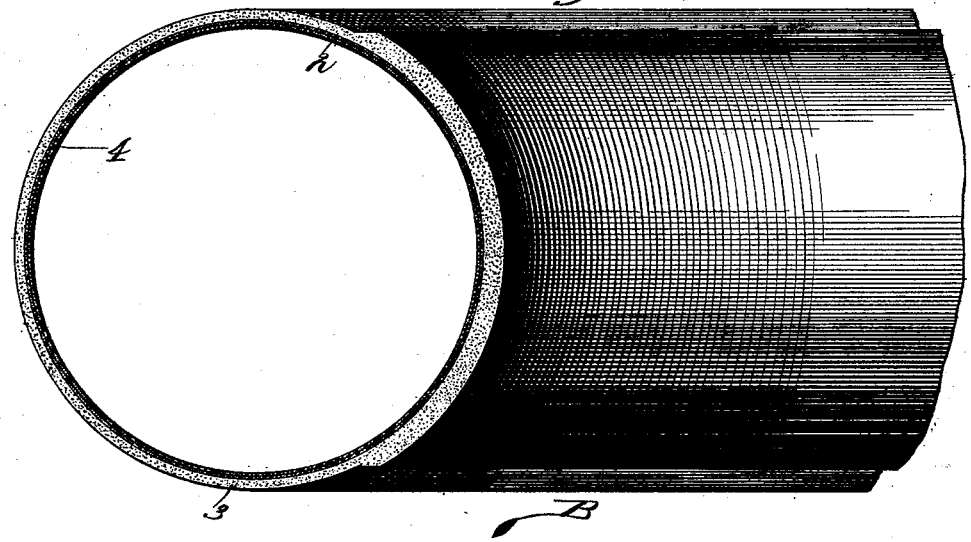
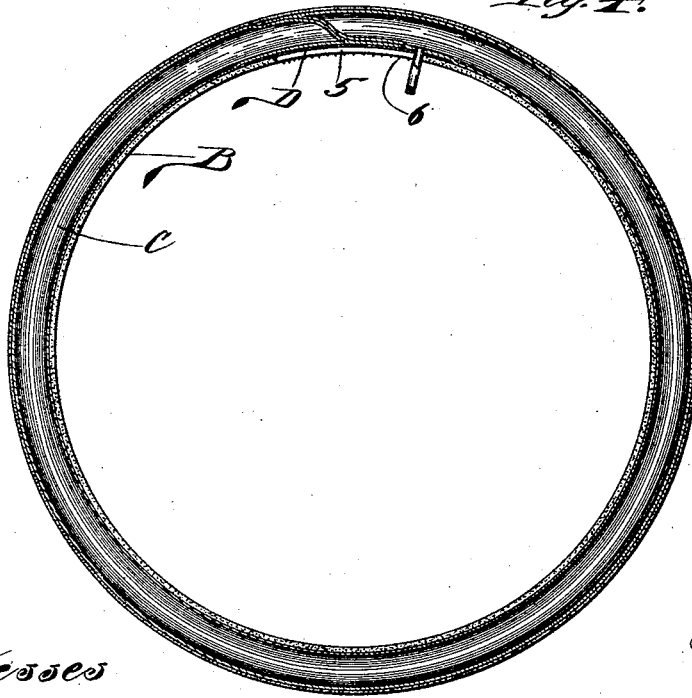

(No Model.) 3 Sheets—Sheet 3.

F. W. MORGAN & R. WRIGHT.
PNEUMATIC TIRE.

No. 496,789. Patented May 2, 1893.

Witnesses
W. D. Middleton
Reta M. Wagner

Inventors
Fred W. Morgan
Rufus Wright
By Chas. G. Page
Atty.

UNITED STATES PATENT OFFICE.

FRED W. MORGAN AND RUFUS WRIGHT, OF CHICAGO, ILLINOIS.

PNEUMATIC TIRE.

SPECIFICATION forming part of Letters Patent No. 496,789, dated May 2, 1893.

Application filed October 26, 1892. Serial No. 450,068. (No model.)

*To all whom it may concern:*

Be it known that we, FRED W. MORGAN and RUFUS WRIGHT, both citizens of the United States, residing at Chicago, in the county of Cook and State of Illinois, have invented a certain new and useful Improvement in Pneumatic Tires, of which the following is a specification.

This application relates to a tire-sheath formed in accordance with the process secured to us by Letters-Patent of the United States No. 490,035. In accordance with said process, we first prepare or arrange upon an annular rigid mandrel having a movable section, the material or layers we employ for forming the tubular sheath, and as a preferred arrangement we first place upon the mandrel a strip of canvas of sufficient width to meet and lap along the annular base line of the sheath, and then place thereon a layer of unvulcanized rubber. We then subject the whole to compression and vulcanization in a mold, so as to mold the rubber to the required ultimate shape and form upon the mandrel an annular, tubular, and seamless sheath. We then split or open the sheath to a limited extent over the mandrel at a point where the latter can be opened, the purpose of the short opening at such juncture being to allow the movable mandrel section to be drawn out and thereby provide in the mandrel a gap adapted to allow the sheath to be stripped from the mandrel which leaves the sheath by way of said split or opening in the latter. This opening in the sheath extends only a short distance along the same and is proportioned with reference to the withdrawal of the mandrel section, and while further serving as a port through which the air tube can be introduced and removed, it is so short, and requires so limited an extent of lacing or other suitable means for closing it, that it does not practically impair the integrity of the sheath as an annular seamless tube, and moreover the limited extent of lacing or other closing means which can be employed, does not materially add to the weight of the tire. The sheath thus formed involves as an article of manufacture various desirable characteristics which readily distinguish it from all other tire sheaths made prior to our invention. These characteristics are as follows:—First. The outer tubular layer of rubber is seamless, except at the point where the short split occurs in contradistinction to a sheath split entirely along its base. Second. This endless seamless tubular layer of rubber is well compacted and is of uniform density and compactness, and the wall of the annular passage within the sheath is true and regular in cross section at each and every point, since it conforms exactly to the surface of the mandrel, which said features have not been, and so far as is now known in the art, cannot be attained by the "blown" process, that is to say by molding and vulcanizing the tube while an internal pressure is created by the expansion of some fluid or liquid. Third. In all "blown" tires, the sheath must be made with an inner layer of rubber, otherwise the fluid or liquid would be forced through the canvas. In accordance with our said mode of preparing the sheath however, we can dispense with such inner layer of rubber, and thereby lighten the sheath.

Figure 2:
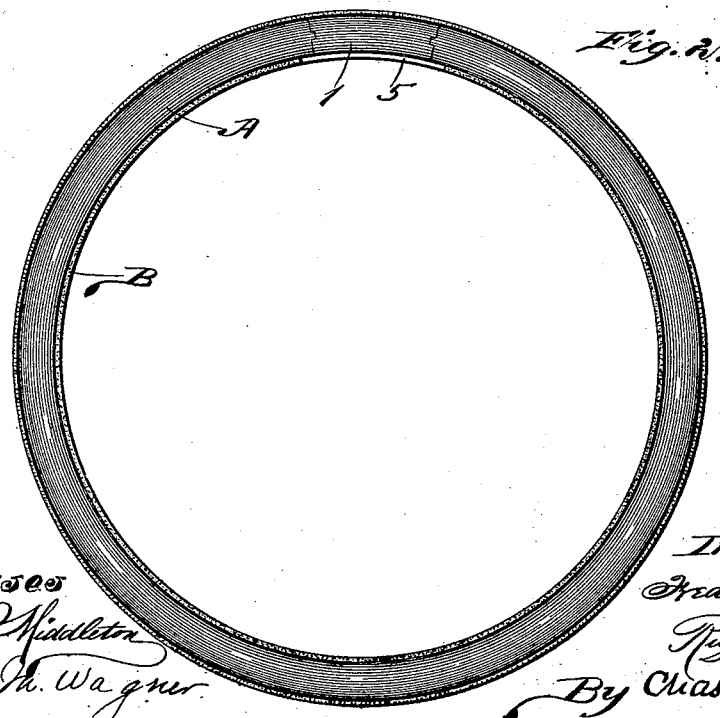
Figure 5:
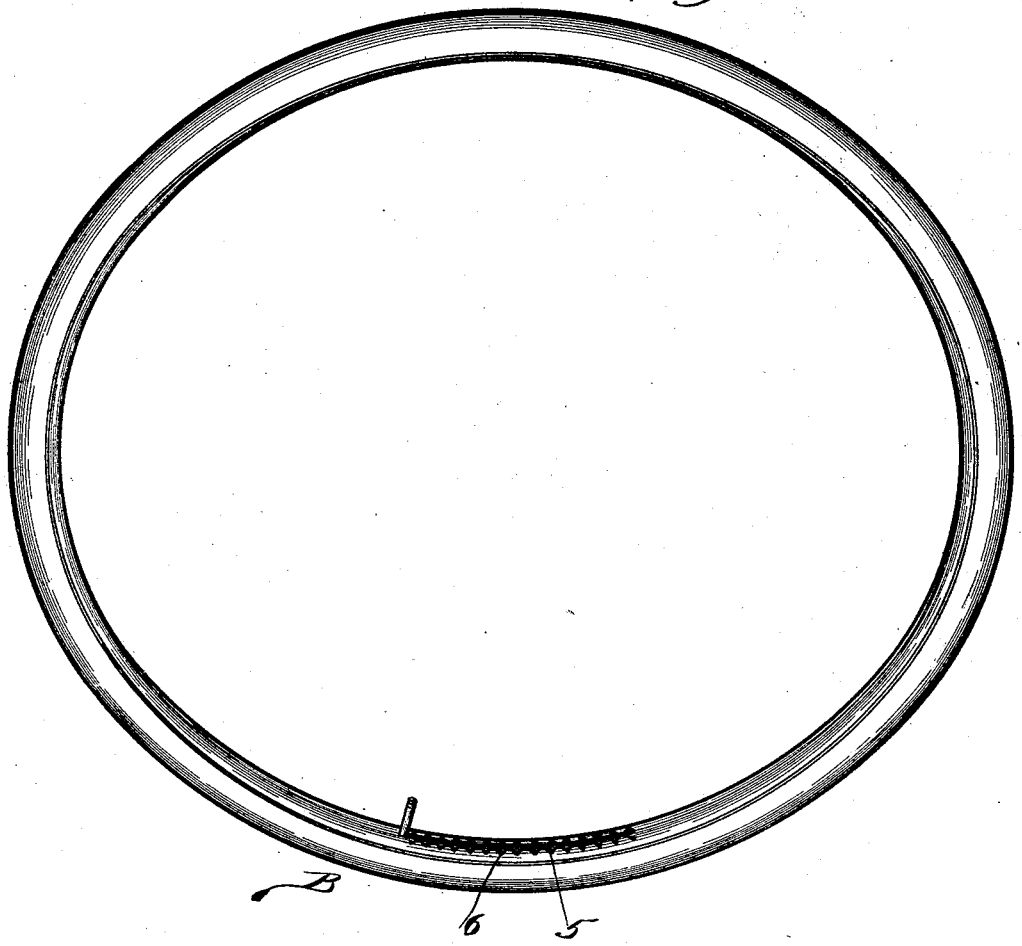

In the accompanying drawings,—Figure 1 represents the endless and seamless tubular sheath understood to have been formed upon an annular mandrel. Fig. 2 is a section through the sheath, the mandrel being shown in elevation. Fig. 3 is a section taken through a portion of the sheath on a plane at right angles to the plane of the preceding figure, and in a larger scale. Fig. 4 is a section through the sheath and an inclosed air-tube on the plane of Fig. 2. Fig. 5 is a view of the sheath showing the opening.

In constructing the tire illustrated in said drawings, we take the mandrel A with its removable section 1 in place, and form upon the mandrel a tubular layer 2 of canvas which is desirably prepared with a thin coating of rubber or rubber cement which renders it adhesive. We then apply upon this tubular structure or layer of canvas, a layer of rubber which for ordinary weight tires may have a canvas lining 2 prepared with a thin coating of rubber cement to render it adhesive, but which for lighter weight tires can be used without such lining. The tubular structure thus formed upon the mandrel is then placed within a mold and subjected to pressure which molds the rubber layer in conformity with the shape of mold employed, and shapes the sheath generally in conformity with the mold and mandrel, and while compacting the rubber layer 3, also causes the same to form a seamless tube, the said article being also subjected to vulcanization to adapt the rubber for service.

The sheath B as it comes from the mold, is an annular and seamless tubular structure, and owing to the mold pressure and the presence of an internally arranged rigid mandrel, the outer tubular layer of rubber will be of uniform density, well compacted, and desirably, comparatively thin, it being observed that for certain kinds of wheel rims we form the mold with an annular groove so as to somewhat thicken up the base or seating portion of the tire. The sheath is then split for a short distance over the removable mandrel section, the split 5 being of sufficient length to permit the removal of the said detachable mandrel section and the subsequent stripping of the sheath from the remaining portion of the mandrel, which said mandrel forms the subject of our application for Letters Patent of the United States, Serial No. 456,204, filed December 24, 1892. After removing the sheath from the mandrel, the edge portions of the sheath along its short slit, can be punctured for lacing where lacing is to be used, an air tube C can be introduced within the sheath, a strip D of canvas or like material can be arranged between the air-tube and split, and the sheath can then be laced as at 6 or otherwise suitably closed along its short split.

The air-tube can be easily introduced through the split and drawn through the sheath by what we may term a threading process, it being our practice to give a string a hitch about one end of the air-tube; introduce within the sheath, a weight attached to the opposite end of the string; turn the sheath so as to cause the weight to traverse the tubular sheath passage or interior until it again reaches the slit, and then draw out the weighted end of the string so as to draw the air tube within the sheath.

From the foregoing it will be seen that we mold and vulcanize an endless and seamless tubular tire sheath or casing upon an annular mandrel, and then remove the sheath or casing from the mandrel without materially affecting or changing the characteristics of the sheath or casing, that is to say, without impairing its integrity as an endless and seamless tube, and that to such end, we open the sheath or casing to a limited extent over the said mandrel; then open or separate the mandrel adjacent to the opening thus formed in the sheath, and then cause the sheath and mandrel to part from one another by way of said opening, which, while forming an outlet for the relative discharge of the mandrel, also provides an inlet for the subsequent admission of an air tube. The split formed as aforesaid, is so limited with relation to the length or extent of the annular seating portion of the tire, and bears so small a proportion thereto, that regardless of its presence, the sheath practically remains an endless, and seamless tubular structure.

The sheath, molded as herein described upon a mandrel, is also characterized by various features of decided improvement over "blown tires," that is to say—tires in which the tubular passage is shaped by the presence of a body of some gaseous fluid or liquid, since with the latter mentioned process, it is not practical to render the sheath of uniform thickness and density, and form the wall of such passage perfectly even and uniform, and moreover such process is expensive and disadvantageous in various other particulars. But by molding the sheath upon a mandrel, the wall of its bore or passage will be true in conformity with the surface of the mandrel, and hence if for example the mandrel is circular in cross-section, the bore or passage will accurately correspond with the same regardless of the form of the mold.

By our process we produce a tire having an admitted high degree of durability and perfection, and of tested merit as a racing tire, and in addition to such qualities, we are enabled to provide high grade tires in an exceedingly rapid way and hence materially cheapen the same.

While as a matter of course, the thickness of the tubular rubber sheet or layer forming the exterior portion of the tire sheath, may be varied to suit the use to which the tire is to be put, it is observed that for racing purposes it is desirable to make the same as thin as is consistent with strength and durability, so that when the sheath is distended to the limit or proximate limit, it will by reason of the inclosed elastic cushion formed by the inflated elastic air tube have increased activity or resiliency.

It will thus be seen that among various advantages and distinguishing characteristics, the sheath or tire thus involves certain peculiarities which are not found in "blown" tire-tubes. It is understood therefore that the term molded, where used in the specification and claims herein, expressly relates to a sheath or tire molded upon a mandrel in contradistinction to a blown sheath tire. Also that said molded sheath involves a comparatively thin, uniformly compacted, and tough and durable endless rubber tube, which is seamless throughout except where a short split is made for the purposes hereinbefore described. Also, that we are enabled to provide as a novel and highly serviceable article, a seamless and endless tubular sheath characterized by molding upon a mandrel and provided with a suitably located limited opening for the insertion and removal of the air-tube and constructed with an inner main tube of canvas and an outer covering of rubber, which construction cannot be attained by the "blown process," which latter involves the necesssity of an inner layer of rubber, which as a matter of course further stiffens and impairs the flexibility of the canvas tube. But by our invention, we avoid such undue stiffening of the canvas tube, it being observed that we rely upon the elasticity of the air cushion and flexibility of the sheath as a means for producing an easy riding tire. Also that we can use a comparatively thin outer tubular layer of rubber owing to its uniformity and degree of density attained by compaction, and its practically seamless condition which enables it to uniformly resist lateral stretching strains. In case of accident to the inclosed air-tube, the tire can be unlaced along its short split and the air tube can be withdrawn at such point.

We do not herein claim the air tube shown and described, the same having been made the subject matter of an application for Letters Patent, filed by us December 24, 1892, bearing Serial No. 456,205.

What we claim as our invention is—

1. A hollow or pneumatic tire comprising an endless, seamless tubular sheath molded and vulcanized as described and inclosing a removable air-tube, the sheath being opened to a limited extent so as to provide a limited split or opening for the introduction and withdrawal of the air-tube without materially impairing the integrity of the sheath as a seamless tubular structure, and being further characterized by compression and vulcanization on a mandrel, substantially as set forth.

2. A hollow or pneumatic tire comprising an endless, seamless tubular sheath formed with an inner tubular layer of canvas and an outer tubular layer of rubber molded and vulcanized as described and inclosing a removable air-tube, the sheath being opened to a limited extent so as to provide a limited split or opening for the introduction and withdrawal of the air-tube without materially impairing the integrity of the sheath as a seamless tubular structure, and being further characterized by compression and vulcanization on a mandrel, substantially as set forth.

FRED W. MORGAN.
RUFUS WRIGHT.

Witnesses:
CHAS. G. PAGE,
W. D. MIDDLETON.